(12) United States Patent
Ishizawa et al.

(10) Patent No.: US 7,705,909 B2
(45) Date of Patent: Apr. 27, 2010

(54) CAMERA MODULE WITH IMPROVED LEAF SPRING ATTACHMENT

(75) Inventors: Takashi Ishizawa, Yamagata (JP); Tomohiko Osaka, Yamagata (JP)

(73) Assignee: Mitsumi Electric Co., Ltd. (JP)

( * ) Notice: Subject to any disclaimer, the term of this patent is extended or adjusted under 35 U.S.C. 154(b) by 295 days.

(21) Appl. No.: 11/846,315

(22) Filed: Aug. 28, 2007

(65) Prior Publication Data
US 2008/0055456 A1 Mar. 6, 2008

(30) Foreign Application Priority Data
Aug. 31, 2006 (JP) .............................. 2006-236883

(51) Int. Cl.
*H04N 5/232* (2006.01)
*H04N 5/225* (2006.01)
*G03B 13/00* (2006.01)
*G02B 7/02* (2006.01)

(52) U.S. Cl. ...................... 348/357; 348/374; 359/824

(58) Field of Classification Search .............. 348/240.3, 348/335, 345, 357, 374; 359/814, 824
See application file for complete search history.

(56) References Cited

U.S. PATENT DOCUMENTS 6,229,657 B1  5/2001  Holderer
6,576,864 B2*  6/2003  Dijken et al. ............ 219/121.64
6,608,278 B1*  8/2003  Xie et al. ................ 219/121.64
7,492,538 B2*  2/2009  Ishizawa et al. ............. 359/824
7,627,238 B2*  12/2009  Osaka et al. .................. 396/85

FOREIGN PATENT DOCUMENTS

JP  2004280031 A  10/2004
JP  2005258355 A  9/2005
WO  9954774 A  10/1999

OTHER PUBLICATIONS

"Laser-weld attachment enables repeatable submicron precision" by Geoff Shannon and Edward Palen published May 2002.*

* cited by examiner

*Primary Examiner*—Sinh Tran
*Assistant Examiner*—Daniel M Pasiewicz
(74) *Attorney, Agent, or Firm*—Marger Johnson & McCollom, P.C.

(57) ABSTRACT

A camera module for small digital cameras and camera-equipped cellular phones includes a lens unit; a holder housing the lens unit and displaceable along an optical axis; a coil on the holder; a yoke and magnets in the yoke providing a magnetic field to the coil; a leaf spring for supporting the holder; and an imaging element below the lens unit. The leaf spring includes an outer annular portion attached to the yoke, an inner annular portion attached to the holder, and bridge portions coupled between the outer and inner annular portion to resiliently support the inner annular portion. Each bridge portion has an outer and an inner annular portion side base part, and extends between an inner peripheral edge of the outer annular portion and an outer peripheral edge of the inner annular portion, the outer annular portion welded to the top surface of the yoke.

5 Claims, 6 Drawing Sheets

CAMERA MODULE WITH IMPROVED LEAF SPRING ATTACHMENT

BACKGROUND OF THE INVENTION

1. Field of the Invention

This invention relates to a camera module, and more specifically to a camera module that can be used in small-sized electronic apparatuses such as digital cameras, camera-equipped cellular phones and the like.

2. Description of the Prior Art

A camera module having a function of displacing a lens unit in a direction of an optical axis of the lens unit is used in relatively small-sized digital cameras, camera-equipped cellular phones and the like. This function is used for providing an autofocus function and/or zoom function and the like, and is achieved by an interaction between a magnetic field generated by an electrical current flowing in a coil and a magnetic field generated by a yoke and magnets provided on the yoke.

Such a camera module includes a barrel which holds the lens unit, a holder which houses the barrel therein, and a pair of leaf springs for supporting the holder so that the holder is displaceable in a direction of an optical axis of the lens unit.

FIG. 5 is an exploded perspective view of an autofocus actuator assembly 100 used in a conventional camera module for displacing a lens unit (not shown) in a direction of an optical axis thereof. It is to be noted that an imaging element (not shown) is provided below a base 111 of the actuator assembly 100.

A holder 108 that houses a barrel (not shown) holding the lens unit is provided between a cover 101 and the base 111 so that the holder 108 is displaceable in a direction of an optical axis of the lens unit together with the lens unit.

A ring-shaped inner annular portion 104b of an upper leaf spring 104 and a ring-shaped inner annular portion 110b of a lower leaf spring 110 are attached to the upper and lower cylindrical portions of the holder 108, respectively. Further, a ring-shaped outer annular portion 104a of the upper leaf spring 104 is attached to a top surface of a yoke 105 which is mounted on the base 111 and a ring-shaped outer annular portion 110a of the lower leaf spring 110 is attached to the base 111, respectively.

Three bridge portions 104c are coupled between the outer annular portion 104a and the inner annular portion 104b of the upper leaf spring 104. As is the same with the upper leaf spring 104, three bridge portions 110c are coupled between the outer annular portion 110a and the inner annular portion 110b of the upper leaf spring 110. By resilient deformation of the respective three bridge portions 104c and 110c, the holder 108 can be displaced in a direction of an optical axis of the lens unit.

A plurality of magnets 106 are provided on the yoke 105 so as to produce a magnetic field. The yoke 105 has an axial bore 105a for receiving the holder 108. Further, a coil 107 is provided around an outer periphery of the holder 108 so that the coil 107 is disposed in the magnetic field produced by the magnets and the yoke 105 in a state that the holder 108 is received in the axial bore 105a. By supplying a current to the coil 107 to generate a magnetic field, the holder 108 can be displaced in a direction of an optical axis of the lens unit by a driving force generated by the interaction of the magnetic fields. In this regard, it is to be noted that a component denoted by the reference numeral 103 is a flexible printed circuit board used for supplying a current to the coil 107, a component denoted by the reference numeral 102 is a stopper arranged above the upper surface of the inner annular portion of the upper leaf spring 104, and a component donated by the reference numeral 109 is a plate provided between the lower leaf spring 110 and the bottom surface of the yoke 105.

FIG. 6 is a perspective view of the upper leaf spring 104 and the yoke 105. As described above, the upper leaf spring 104 includes the outer annular portion 104a and the inner annular portion 104b arranged inside the outer annular portion 104a through an annular spacing 104f and having the common axis with the outer annular portion 104a, and the three bridge portions coupled between the outer annular portion 104a and the inner annular portion 104b for resiliently supporting the inner annular portion 104b with respect to the outer annular portion 104a. Each of the bridge portions 104c has an arc shape and provided in the annular spacing 104f so as to extend along an inner periphery of the outer annular portion 104a and an outer periphery of the inner annular portion 104b.

The bottom surface of the outer annular portion 104a of the upper leaf spring 104 is bonded to a top surface of the yoke 105 with a synthetic resin (adhesive) at several locations. The bonding operation is carried out by first applying the synthetic resin onto the top surface of the yoke 105, and then attach the upper leaf spring 104 onto the top surface of the yoke by pushing the upper leaf spring 104 against the yoke 105. The bonding portions by the synthetic resin are present between the upper leaf spring 104 and the top surface of the yoke 105, and they are indicated by the reference numerals 105a.

It is to be noted that an actuator assembly similar to the actuator assembly 100 having such upper leaf spring 104 and lower leaf spring 110 described above is disclosed in JP-A-No. 2004-280031.

In the case where the upper leaf spring 104 is bonded to the yoke 105 with the synthetic resin as described above, there is a problem in that the synthetic resin at any one or more of the bonding portions is spread out due to the pressure applied when the upper leaf spring 104 is pushed against the top surface of the yoke 105 at the bonding operation. If the synthetic resin is spread out onto a base part 104d of the bridge portion 104c from the side of the outer annular portion 104a and then it is hardened on the base part 104d of the bridge portion 104, such a bridge portion 104c becomes difficult to be deformed desiredly, that is a spring constant of the bridge portion 104c is changed. As a result, a load characteristic of such a bridge portion 104c becomes different from those of the other bridge portions 104c, which results in the case that a stable load characteristic cannot be obtained in the upper leaf spring 104. If the upper leaf spring 104 does not have such a stable load characteristic, an initial response speed and an amount of an initial displacement of the holder 108 when an electrical current is supplied to the coil 107 become not stable, and thus it becomes difficult to precisely control the position of the holder 108.

In order to solve this problem, it may be contemplated to reduce an amount of the synthetic resin to be applied onto the top surface of the yoke 105. However, this approach in turn arises a new problem in that the upper leaf spring 104 may be partially peeled off from the top surface of the yoke due to the reduced bonding force in the event that the electronic apparatus equipped with the camera module is dropped by accident.

Further, in order to solve the problem as described above, it may be also contemplated to use a resistance welding method for attachment of the upper leaf spring 104 to the top surface of the yoke 150 without using any synthetic resin. However, in this method, it is necessary to apply a load to the upper leaf spring 104 placed on the top surface of the yoke 105. Due to this load, a stress deformation is likely to occur at the outer annular portion 104 of the upper leaf spring 104 as well as the base parts of the bridge portions 104c, which may result in variations in a load characteristic (spring constant) of the bridge portions 104c. Further, there is another problem in that, in the case where the resistance melding method is used, if the bottom surface of the outer annular portion 104c and/or the surface of the yoke 105 is oxidized, an electrical resistance at the resistance welding changes due to the oxidation, which may result in the case that a predetermined welding strength cannot be obtained.

SUMMARY OF THE INVENTION

The present invention has been made in view of the problems described above, and therefore it is an object of the present invention is to provide a camera module which is provided with a leaf spring having a stable load characteristic and realizing sufficient bonding strength between the leaf spring and a yoke.

In order to achieve the object, the present invention is directed to a camera module, which comprises:

a lens unit which constitutes an optical system of the camera module;

a holder which houses the lens unit and is displaceable along an optical axis direction of the lens unit;

a coil provided on the holder;

a yoke and magnets provided on the yoke for providing a magnetic field to the coil, the yoke having an axial bore in which the holder is received;

upper and lower springs arranged on the upper and lower sides of the holder for displaceably supporting the holder in the optical axis direction; and an imaging element provided below the lens unit, wherein each of the upper and lower leaf spring comprises an outer annular portion which is fixed to a surface of the yoke, an inner annular portion which is provided inside the outer annular portion through an annular spacing and is attached to the holder, and a plurality of bridge portions which are coupled between the outer annular portion and the inner annular portion so as to resiliently support the inner annular portion with respect to the outer annular portion, and wherein each of the bridge portions is formed into a substantially elongated arc shape having an outer annular portion side base part which is coupled to an inner periphery of the outer annular portion and an inner annular portion side base part which is coupled to an outer periphery of the inner annular portion, and is provided so as to extend in the space between the inner periphery of the outer annular portion and the outer periphery of the inner annular portion, wherein at least the outer annular portion of the upper leaf spring is welded to the surface of the yoke by means of a laser welding method.

According to the camera module having the above structure, the outer annular portion of the leaf spring and the top surface of the yoke are welded together by means of a laser welding method. By using the laser welding method, it is possible to determine welding portions between the outer annular portion of the leaf spring and the top surface of the yoke preciously. This makes it possible to set a load characteristic (spring constant) of the bridge portion of the leaf spring to a predetermined setting value reliably. Further, by using the laser welding method, the leaf spring and the yoke are welded at each welding portions and bonded together even in the case where the surfaces of these members at the welding portions are oxidized, and thus they are joined with extremely high bonding strength. Therefore, it becomes possible to prevent the upper leaf spring from being peeled off from the yoke. Furthermore, according to the laser welding method, it is not necessary to apply a load onto the leaf spring placed on the top surface of the yoke, there is no fear that stress deformation occurs at the outer annular portion of the leaf spring and/or the bridge portions thereof due to a load.

In the camera module according to the present invention, it is preferred that the outer annual portion of the upper leaf spring is welded to the surface of the yoke around the outer annular portion side base part of each of the bridge portions.

This arrangement of the welding portions is particularly preferred since a largest stress is applied around the outer annular portion side base part of each of the bridge portions when the upper leaf spring is deformed by large displacement of the holder.

In the camera module according to the present invention, it is also preferred that each of the welding portions include two smaller welding portions which are respectively located spaced apart from the outer annular portion side base part of each of the bridge portions in a substantially same distance.

According to this arrangement, it is possible to make an area of each small welding portion smaller than the area of the welding portion. Therefore, according to this arrangement, it is possible to obtain a sufficient bonding strength even in the case where the width of the outer annular portion is small.

In the camera module according to the present invention, it is also preferred that the outer annular portion of the upper leaf spring is formed with protrusions which protrude toward the yoke at locations corresponding to the welding portions of the outer annular portion and the yoke.

According to this arrangement, when the upper leaf spring is placed on the surface of the yoke for the welding process by the laser welding method, the upper leaf spring is supported on the surface of the yoke through the tree protrusions so that the surfaces of the respective protrusions which will be used as the welding portions are reliably in surface to surface contact with the surface of the yoke. Therefore, when the laser welding is carried out, the protrusions of the upper leaf spring are reliably melted together with the corresponding portions of the yoke, thereby enabling a stable welding strength to be obtained.

In the camera module according to the present invention, it is also preferred that the yoke is formed with protrusions which protrude toward the upper leaf spring at locations corresponding to the welding portions of the outer annular portion and the yoke.

According to this arrangement, when the upper leaf spring is placed on the surface of the yoke for the welding process by the laser welding method, the upper leaf spring is supported on the yoke through the tree protrusions so that the surfaces of the respective protrusions which will be used as the welding portions are reliably is surface to surface contact with the bottom surface of the upper leaf spring. Therefore, when the laser welding is carried out, the protrusions of the yoke are reliably melted together with the corresponding portions of the upper leaf spring, thereby enabling a stable welding strength to be obtained.

Another aspect of the present invention is directed to a camera module, comprising:

a lens unit which constitutes an optical system of the camera module;

a holder which houses the lens unit and is displaceable along an optical axis direction of the lens unit;

a coil provided on the holder;

a yoke and magnets provided on the yoke for providing a magnetic field to the coil;

at least one leaf spring for supporting the holder; and an imaging element provided below the lens unit, wherein the at least one leaf spring comprises an outer annular portion which is fixed to a surface of the yoke, an inner annular portion which is provided inside the outer annular portion through an annular spacing and is attached to the holder, and a plurality of bridge portions which are coupled between the outer annular portion and the inner annular portion so as to resiliently support the inner annular portion with respect to the outer annular portion, and wherein each of the bridge portions is formed into an elongated arc shape having an outer annular portion side base part which is coupled to an inner periphery of the outer annular portion and an inner annular portion side base part which is coupled to an outer periphery of the inner annular portion, and is provided so as to extend in the space between the inner periphery of the outer annular portion and the outer periphery of the inner annular portion, wherein the outer annular portion of the leaf spring is welded to a stationary component made of a metal material by means of a laser welding method.

The above and other objects, features and advantages of the present invention will be apparent from the following description when taken in conjunction with the accompanying drawings which illustrate preferred embodiments of the present invention by way of example.

DETAILED DESCRIPTION OF THE PREFERRED EMBODIMENTS

Figure 1:
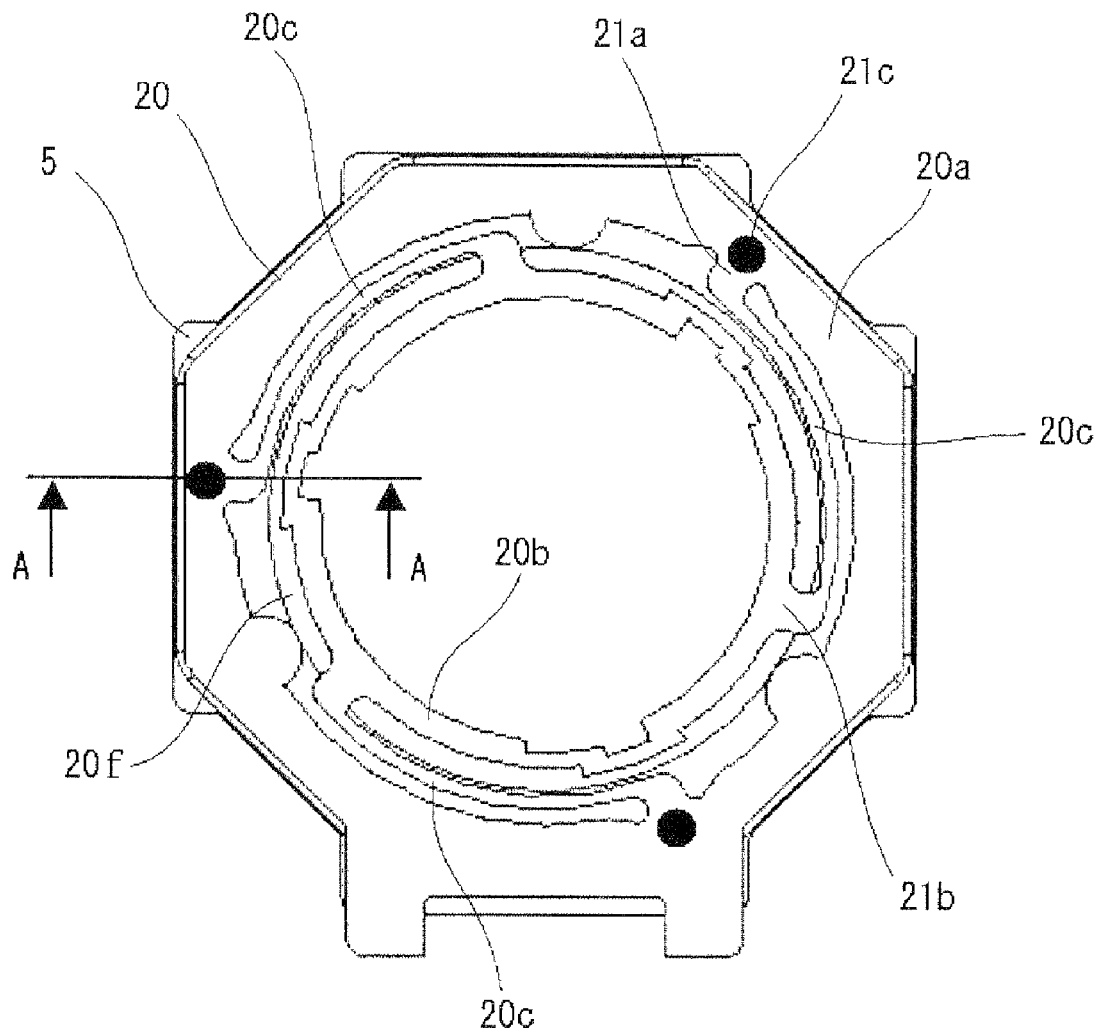
FIG. 1 is a plan view of an upper leaf spring 20 used in a camera module according to an embodiment of the present invention, which shows a state that the upper leaf spring is welded to a top surface of the yoke 5. It is to be noted here that portions indicated with black dots are welding portions 21c.

A camera module according to an embodiment of the present invention will be described below with reference to the accompanying drawing.

A camera module is composed from a lens unit (not shown) which constitutes an optical system of the camera module; a holder 8 which houses the lens unit and is displaceable along an optical axis of the lens unit; a coil 7 provided on the holder 8; a yoke 5 which is one of stationary components of the camera module and magnets 6 provided on the yoke 5 for providing a magnetic field to the coil 7; an upper leaf spring 20 and a lower leaf spring 30 for supporting the holder 8; and an imaging element (not shown) provided below the lens unit. In this camera module, the upper leaf spring 20 includes an outer annular portion 21 which is attached to a tope surface of the yoke 5, an inner annular portion 22 provided inside the outer annular portion 21 through an annular spacing 20f and attached to the holder 8, and a plurality of bridge portions 20c portions which are coupled between the outer annular portion 20a and the inner annular portion 20b so as to resiliently support the inner annular portion 20b with respect to the outer annular portion 20a. Each of the bridge portions 20c has an outer annular portion side base part 21a coupled to an inner periphery of the outer annular portion 20a and an inner annular portion side base part 21b coupled to an outer periphery of the inner annular portion 20b. The cameral module described above is characterized in that the outer annular portion 20a of the leaf spring 20 is attached to the yoke 5 by means of a laser welding method.

Figure 4:
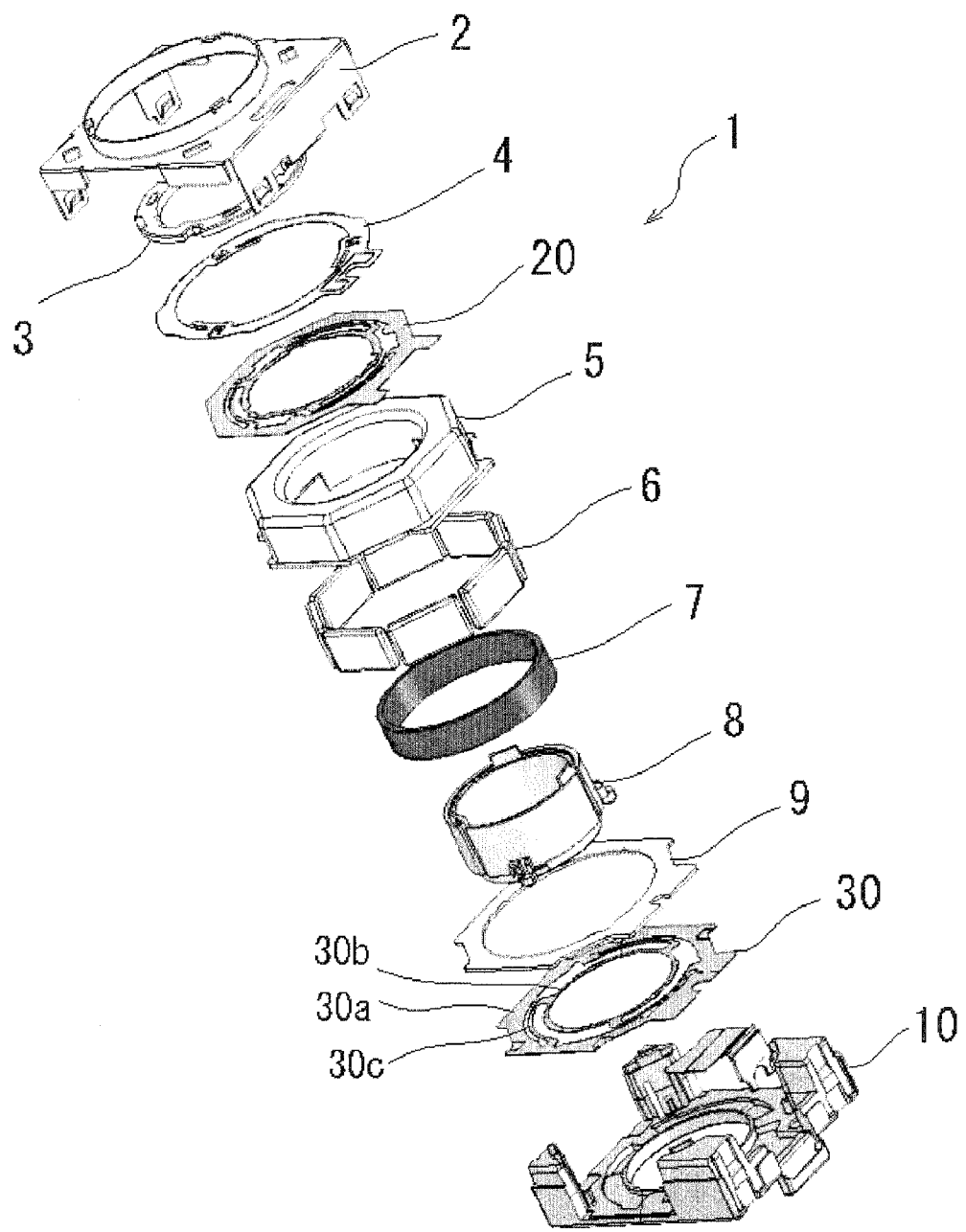
FIG. 4 is an exploded perspective view of an actuator assembly 1 of the camera module according to the embodiment of the present invention.
Figure 5:
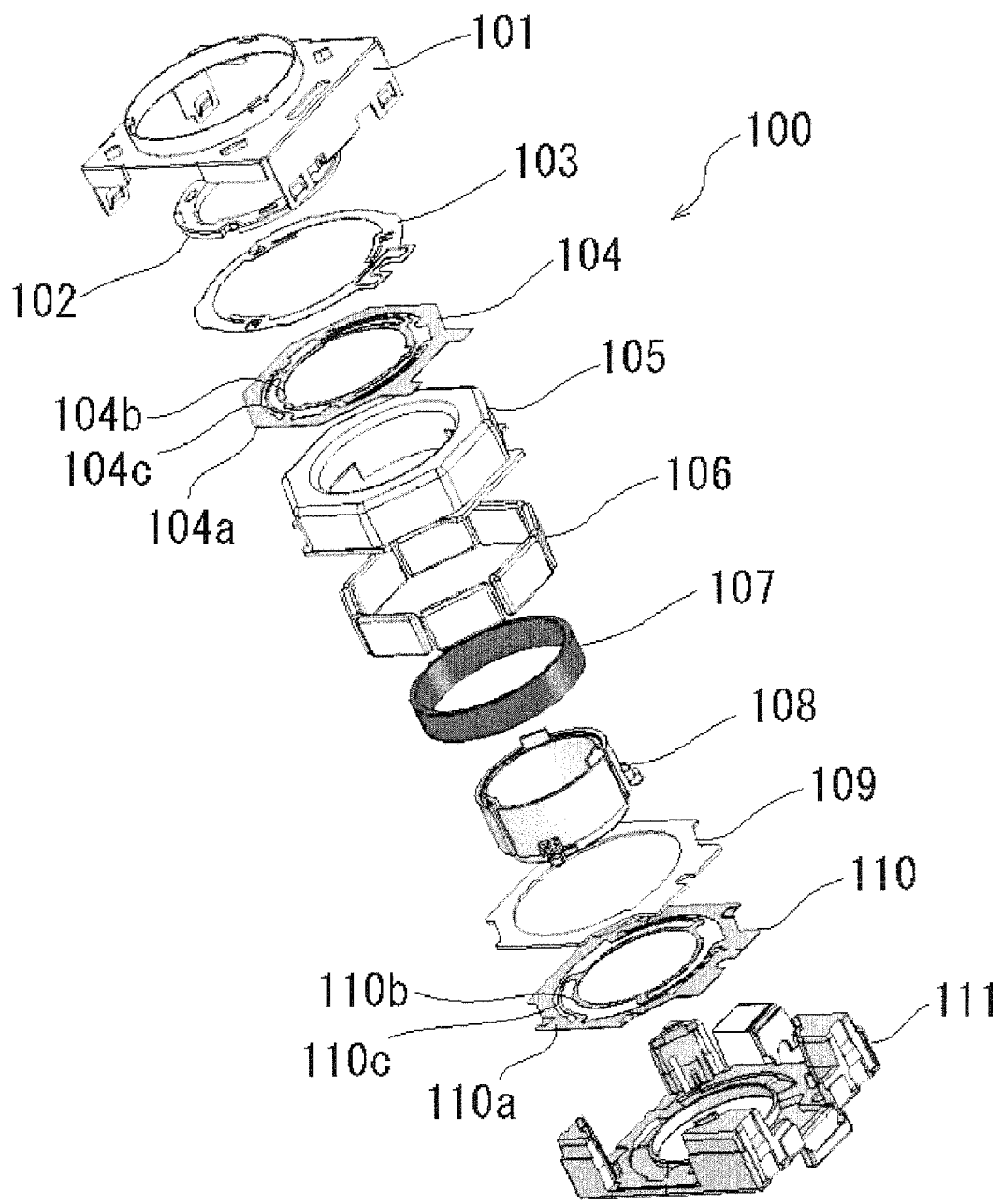
FIG. 5 is an explored perspective view of an actuator assembly 100 of the conventional camera module.
Figure 6:
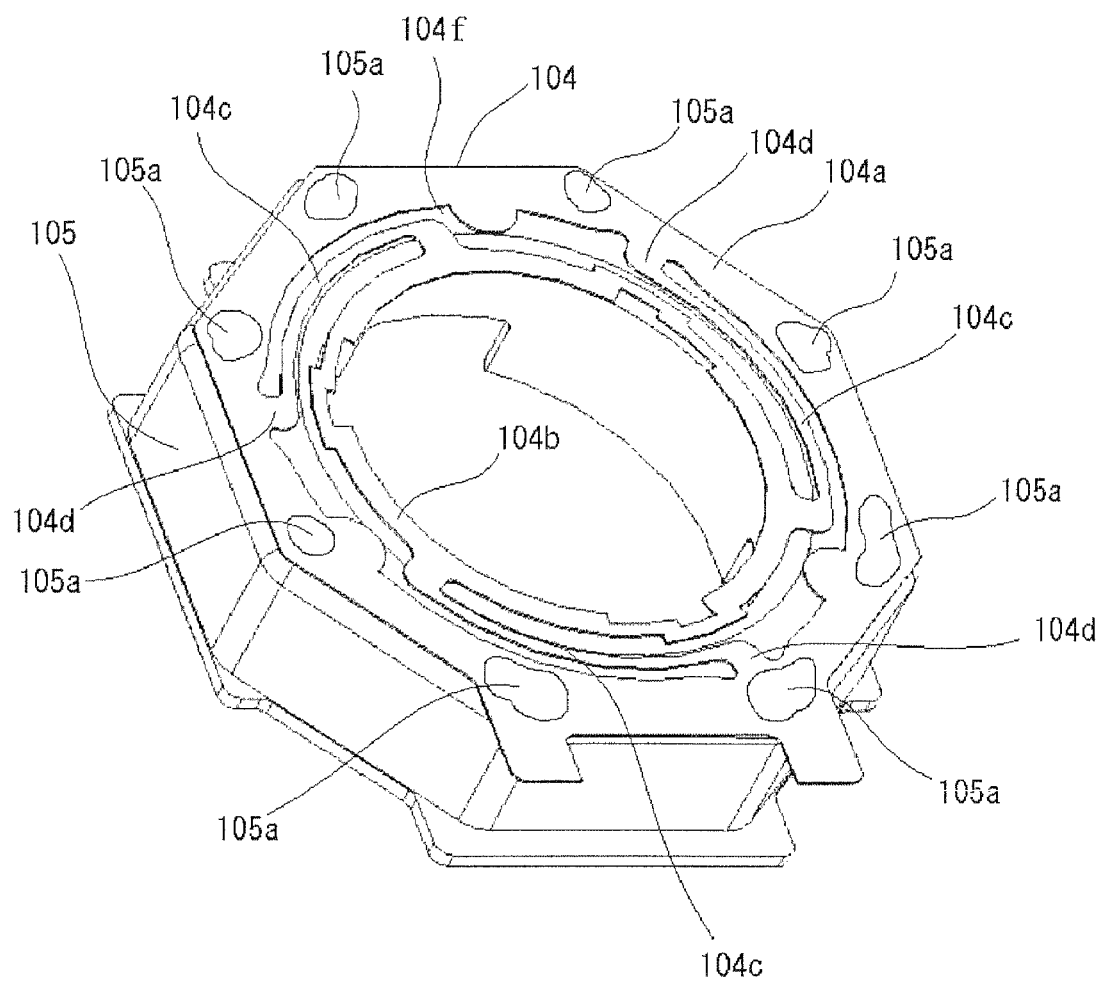
FIG. 6 is a perspective view of the upper leaf spring 104 and the yoke 105 used in the actuator assembly 100 shown in FIG. 5. It is to be noted that the bonding portions 105a are present between the bottom surface of the upper leaf spring 104 and the top surface of the yoke 105.

Hereinbelow, an actuator assembly 1 of the camera module according to the embodiment of the present invention will be described in detail with reference to FIG. 4. In this regard, it is to be noted that the imaging element (not shown) is provided below a base 10.

The holder 8 that houses the barrel (not shown) holding the lens unit is provided in a space defined between a cover 2 and the base 10 so that the holder 8 is displaceable in a direction of an optical axis of the lens unit.

The inner annular portion 20b of the upper leaf spring 20 is attached to the upper end surface of a cylindrical portion of the holder 8. In the same way, the inner annular portion 30b of the lower leaf spring 30 is also attached to the lower end surface of the cylindrical portion of the holder 8. The outer annular portion 20a (see FIG. 1) of the upper leaf spring 20 is attached to the top surface of the yoke 5 and the outer annular portion 30a of the lower leaf spring 30 is attached to the base 10.

The plurality of magnets 6 are bonded to the inner surface of the yoke 5 so as to produce a magnetic field. Further, the coil 7 is provided around an outer periphery of the holder 8 so that the coil 7 is disposed in the magnetic field generated by the magnets 6 and the yoke 5. The yoke 7 has an axial bore 8a for receiving the holder. The holder 8 can be displaced through the axial bore 8a in a direction of an optical axis of the lens unit by supplying a current to the coil 7. It is noted that a component denoted by the reference numeral 4 is a flexible printed circuit board used for supplying a current to the coil 7, a component denoted by the reference numeral 3 is a stopper arranged above the upper surface of the inner annular portion 20b (see FIG. 1) of the upper leaf spring 20, and a component denoted by the reference numeral 9 is a plate provided between the lower leaf spring 30 and the bottom surface of the yoke 5.

Next, the upper leaf spring 20 and the yoke 5 will be described in details with reference to FIG. 1. The upper leaf spring 20 is formed from a thin metal plate made of beryllium copper through a punching process and has the ring-shaped outer annular portion 20a and the ring-shaped inner annular portion 20b which is concentrically provided inside the outer annular portion 20a through a predetermined annular spacing 20f. The inner annular portion 20b is supported by the outer annular portion 20a through the bridge portions 20c. Each of the bridge portions 20c has an elongated arc-shape, and positioned inside the annular spacing 20f so that it extends along the inner periphery of the outer annular portion 20a and the outer periphery of the inner annular portion 20b through a predetermined angle. Further, each of the bridge portions 20c has the outer annular portion side base part 21a coupled to the inner periphery of the outer annular portion 20a and the inner annular portion side base part 21b which is coupled to the outer periphery of the inner annular portion 20b. The upper leaf spring 20 and the yoke 5 are welded together by means of a laser welding method. The welding operation is carried out by irradiating a portion of the upper leaf spring 20 placed on the top surface of the yoke 5 with a laser beam so that the portion of the upper leaf spring 20 and the yoke 5 at a laser beam spot is welded by the laser beam. The laser welding is carried out at three locations, and three welding portions of the upper leaf spring 20 and the yoke 5 are shown by the reference numerals 21c in FIG. 1. In this regard, it is to be noted that the depth of each of the welding portions in the yoke 5 is slightly larger than the thickness of the upper leaf spring 20.

Hereinbelow, description will be made with regard to the advantages of the embodiment described above.

In the camera module of this embodiment, the outer annular portion 20a of the upper leaf spring 20 and the top surface of the yoke 5 which is one of stationary components of the camera module are welded together by means of a laser welding method. By using the laser welding method, it is possible to determine welding portions between the outer annular portion 20a of the top leaf spring 20 and the yoke 5 preciously. This makes it possible to set a load characteristic (spring constant) of each of the bridge portions 20c of the upper leaf spring 20 to a predetermined setting value. Therefore, it is possible to obtain an upper leaf spring having a stable load characteristic. Further, by using the laser welding method, the upper leaf spring 20 and the yoke 5 are welded at each welding portions and bonded together even in the case where the surfaces of these members at the welding portions are oxidized, and thus they are joined with extremely high bonding strength. Therefore, it becomes possible to prevent the upper leaf spring 20 from being peeled off from the yoke 5. Furthermore, according to the laser welding method, it is not necessary to apply a load onto the leaf spring 20 placed on the top surface of the yoke 5, there is no fear that stress deformation occurs at the outer annular portion 20a of the upper leaf spring 20 and/or the bridge portions 20c thereof due to a load.

Further, according to the camera module of this embodiment, the welding portions 21c by the laser welding method are located around the outer annular portion side base part 21a of each bridge portion 20c. This arrangement of the welding portions is particularly preferred since a largest stress is applied around the outer annular portion side base part of each of the bridge portions when the leaf spring is deformed by large displacement of the holder.

Figure 2:
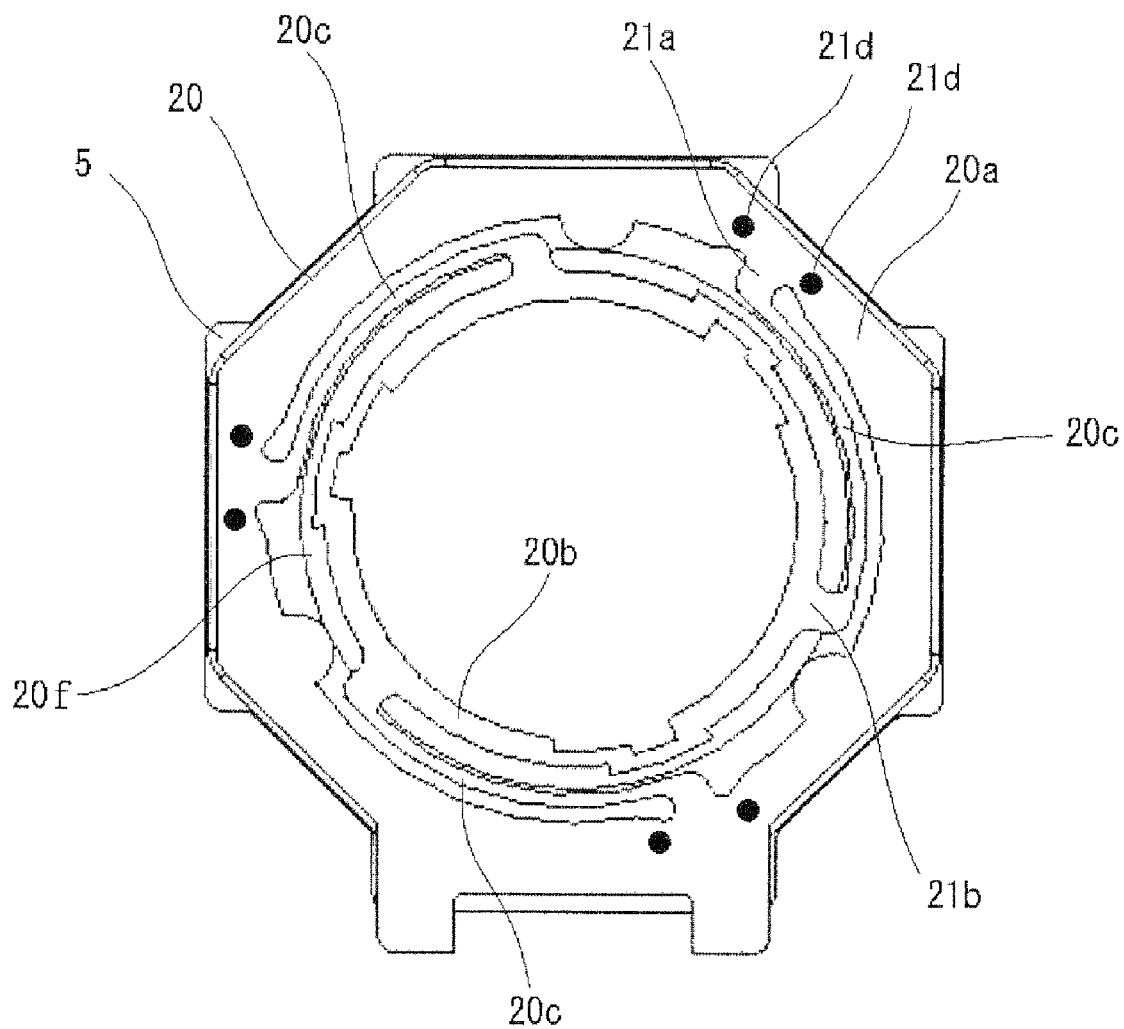
FIG. 2 is a plan view of an upper leaf spring 20 used in the camera module according to another embodiment of the present invention, which shows a state that the upper leaf spring is welded to the top surface of the yoke 5. It is to be noted here that portions indicated with six black dots denote welding portions 21c.

In this regard, please note that the locations of the welding positions of the embodiment is a mere one example. Therefore, for example as shown in FIG. 2, each of the welding portions 21c of this embodiment may be changed into two smaller welding portions 21d which are respectively spaced apart from the outer annular portion side base part 21a in a substantially same distance. According to this arrangement, it is possible to make an area of each small welding portion 21d smaller than the area of the welding portion 21c. Therefore, according to this arrangement, it is possible to obtain a sufficient bonding strength even in the case where the width of the outer annular portion 20a is small.

Figure 3:
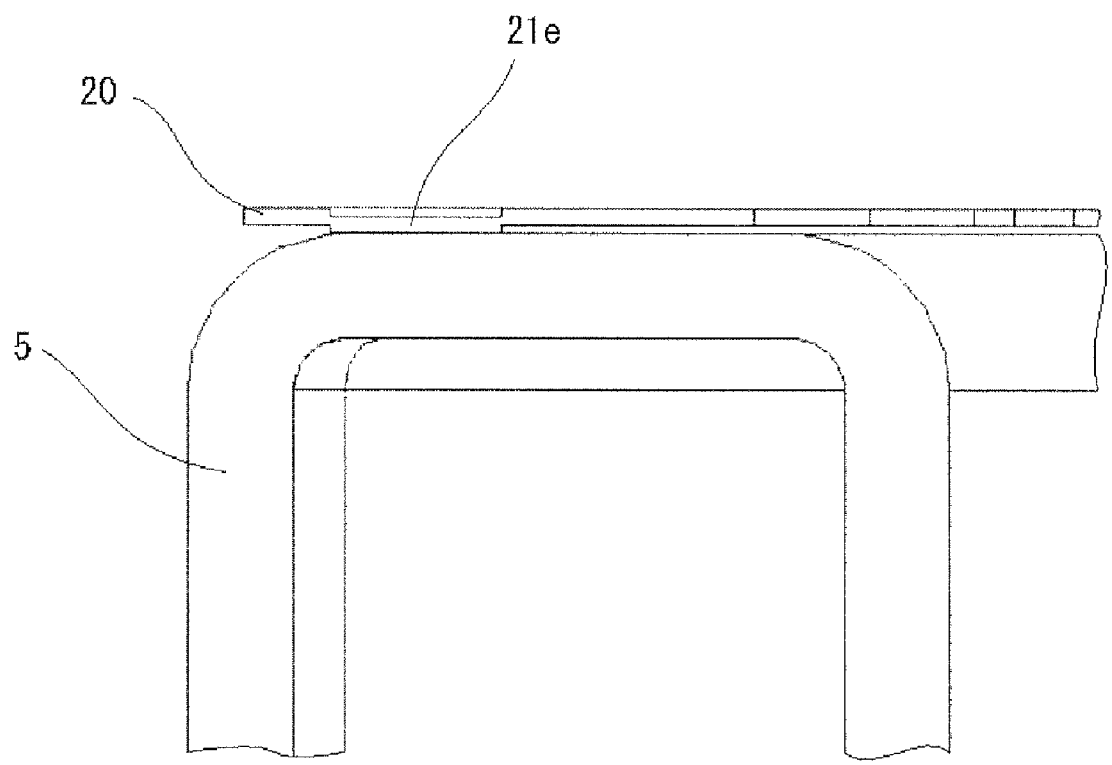
FIG. 3 is a cross sectional view taken along a ling A-A in FIG. 1, which shows a positional relationship between the upper leaf spring 20 and the yoke 5 when the welding portions are formed with protruding portions 21e.

Further, in the camera module according to the embodiment described above, it is preferred that the outer annular portion 20 is formed with protrusions 21e which protrude toward the yoke 5 at locations corresponding to the welding portions of the outer annular portion 20a and the yoke 5. As shown in FIG. 3 which is a cross sectional view taken along a ling A-A in FIG. 1, the protrusions 21e are formed at three locations of the outer annular portion 20a corresponding to the welding portions 21c by a press working so that each of the protrusions 21a has a size corresponding to each welding portion 21c. Therefore, when the upper leaf spring 20 is placed on the surface of the yoke 5 for the welding process by the laser welding method, the upper leaf spring 20 is supported on the surface of the yoke 5 through the tree protrusions 21e so that the surfaces of the respective protrusions 21e which will be used as the welding portions are reliably in surface to surface contact with the top surface of the yoke 5.

Therefore, when the laser welding is carried out, the welding portions 21c are reliably melted together with the corresponding portions of the yoke 5, thereby enabling a stable welding strength to be obtained.

In the embodiment as described above, the protrusions 21c are formed on the upper leaf spring 20, but alternatively, such protrusions 21e may be formed on the top surface of the yoke 5 instead of forming the protrusions 21e on the upper leaf spring 20. In this alternative structure, it is possible to obtain the same functions and effects as those of the protrusions 21e formed on the upper leaf spring 20.

Further, please note that the present invention is not limited to the case where the outer annular portion of the upper leaf spring 20 is welded to the surface of the yoke 5 by means of the laser welding method like the embodiment described above. It is also possible to apply the present invention to the other case where the upper leaf spring 20 and/or the lower leaf spring 30 is fixed to a stationary component made of a metal material. For example, the outer annular portion of the lower leaf spring 30 may be welded to the lower end surface of the yoke 5 by means of the laser welding method. Further, if the base 10 is made of a metal material, the outer annular portion of the lower leaf spring 30 may be welded to the base 10 by means of the laser welding method. Furthermore, if the cover 2 is made of a metal material, the outer annular portion of the upper leaf spring 20 may be welded to the cover by means of the laser welding method.

Finally, it should be understood that the present invention is not limited to the preferred embodiments described hereinabove and, needless to say, a variety of modifications or variations may be made without departing from the scope of the invention defined in the following claims.

Further, it is also to be understood that the present disclosure relates to subject matter contained in Japanese Patent Application No. 2006-236883 (filed on Aug. 31, 2006) which is expressly incorporated herein by reference in its entirety.

What is claimed is:

1. A camera module, comprising:
a lens unit which constitutes an optical system of the camera module;
a holder which houses the lens unit and is displaceable along an optical axis direction of the lens unit;
a coil provided on the holder;
a yoke and magnets provided on the yoke for providing a magnetic field to the coil, the yoke having an axial bore in which the holder is received;
upper and lower springs arranged on the upper and lower sides of the holder for displaceably supporting the holder in the optical axis direction; and
an imaging element provided below the lens unit,
wherein each of the upper and lower leaf springs comprises an outer annular portion which is fixed to a top surface of the yoke, an inner annular portion which is provided inside the outer annular portion through an annular spacing and is attached to the holder, and a plurality of bridge portions which are coupled between the outer annular portion and the inner annular portion so as to resiliently support the inner annular portion with respect to the outer annular portion, and wherein each of the bridge portions of the upper leaf spring is formed into an elongated arc shape having an outer annular portion side base part which is coupled to an inner periphery of the outer annular portion and an inner annular portion side base part which is coupled to an outer periphery of the inner annular portion, and is provided so as to extend in the annular spacing between the inner periphery of the outer annular portion and the outer periphery of the inner annular portion,
wherein the outer annular portion of the upper leaf spring is welded to the top surface of the yoke by means of a laser welding method at a plurality of welding portions each of which is located around the outer annular portion side base part of each of the bridge portions.

2. The camera module as claimed in claim 1, wherein each of the welding portions include two smaller welding portions which are respectively located spaced apart from the outer annular portion side base part of each of the bridge portions in a same distance.

3. The camera module as claimed in claim 1, wherein the outer annular portion of the upper leaf spring is formed with protrusions which protrude toward the yoke at locations corresponding to the welding portions of the outer annular portion and the yoke.

4. The camera module as claimed in claim 1, wherein the yoke is formed with protrusions which protrude toward the upper leaf spring at locations corresponding to the welding portions of the outer annular portion and the yoke.

5. The camera module as claimed in claim 1, wherein the plurality of bridge portions include three bridge portions which are arranged with equal intervals in the circumferential direction, and the plurality of welding portions are located only around the outer annular portion side base part of each of the bridge portions at three locations.

* * * * *